United States Patent [19]
Tran et al.

[11] Patent Number: 5,974,542
[45] Date of Patent: Oct. 26, 1999

[54] BRANCH PREDICTION UNIT WHICH APPROXIMATES A LARGER NUMBER OF BRANCH PREDICTIONS USING A SMALLER NUMBER OF BRANCH PREDICTIONS AND AN ALTERNATE TARGET INDICATION

[75] Inventors: Chinh N. Tran; W. Kurt Lewchuk, both of Austin, Tex.

[73] Assignee: Advanced Micro Devices, Inc., Sunnyvale, Calif.

[21] Appl. No.: 08/960,818

[22] Filed: Oct. 30, 1997

[51] Int. Cl.$^6$ ........................................................ G06F 9/40
[52] U.S. Cl. ............................................................ 712/239
[58] Field of Search ............................................. 712/239

[56] References Cited

U.S. PATENT DOCUMENTS

| | | | |
|---|---|---|---|
| 4,044,338 | 8/1977 | Wolf ........................................... | 365/49 |
| 4,453,212 | 6/1984 | Gaither et al. ............................... | 711/2 |
| 4,807,115 | 2/1989 | Torng ........................................ | 712/215 |
| 4,858,105 | 8/1989 | Kuriyama et al. ........................... | 712/235 |
| 4,860,197 | 8/1989 | Langendorf et al. ........................ | 712/238 |
| 4,928,223 | 5/1990 | Dao et al. .................................. | 712/247 |
| 5,053,631 | 10/1991 | Perlman et al. ............................ | 364/748 |
| 5,058,048 | 10/1991 | Gupta et al. ............................... | 364/748 |
| 5,129,067 | 7/1992 | Johnson .................................... | 395/375 |
| 5,136,697 | 8/1992 | Johnson .................................... | 395/375 |
| 5,142,634 | 8/1992 | Fite et al. .................................. | 395/375 |
| 5,226,126 | 7/1993 | McFarland et al. ........................ | 712/218 |
| 5,226,130 | 7/1993 | Favor et al. ............................... | 712/238 |
| 5,651,125 | 7/1997 | Witt et al. ................................. | 712/218 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," 1994, pp.2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

(List continued on next page.)

*Primary Examiner*—David Y. Eng
*Attorney, Agent, or Firm*—Conley, Rose & Tayon, PC; B. Noel Kivlin; Lawerence J. Merkel

[57] ABSTRACT

A branch prediction unit includes a cache-line based branch prediction storage having a branch prediction storage location assigned to each cache line of an instruction cache within the microprocessor employing the branch prediction unit. Although each branch prediction storage location is assigned to a particular cache line, the branch prediction storage location stores an alternate target indication indicating whether a branch prediction within the storage location corresponds to a branch instruction within the cache line to which the storage location is assigned or to a branch instruction within a different cache line. The different cache line has a predetermined relationship to the cache line to which the storage location is assigned. In various embodiments, the different cache line is at an index one less than the index of the storage location or is within a different way of the same index. The branch prediction unit described herein approximates having multiple branch predictions per cache line even though only one branch prediction storage location is assigned to the cache line. In cases in which a branch prediction would have been unused due to a lack of sufficient predicted-taken branch instructions within a cache line, the unused branch prediction may be used by a different cache line having a large number of branch instructions.

47 Claims, 12 Drawing Sheets

OTHER PUBLICATIONS

*Intel Architecture Software Developer's Manual*, vol. 1: Basic Architecture", Intel Corporation, Prospect IL, 1996, 1997, Chapter 8: Programming With The Intel MMX™ Technology, pp. 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

XP)))687816 Caler, et al, "Next Cache Line and Set Prediction," Proceedings of The $22^{nd}$ Annual Symposium on Computer Architecture Santa Margherita Ligure, IT, Jun. 22–24, 1995, No. Symp. 22, pp. 287–296.

International Search Report for PCT/US 98/12643 dated Nov. 5, 1998.

| Split Line? (82) | AT, SBPA (84) | AT, SBPA+1 (86) | Eligible Branch Predictions (88) |
|---|---|---|---|
| Y | 0 | 0 | SBPA+1 |
| Y | 1 | 0 | SBPA+1 |
| Y | 0 | 1 | None (predict sequential) |
| Y | 1 | 1 | None (predict sequential) |
| N | 0 | 0 | SBPA |
| N | 1 | 0 | None (predict sequential) |
| N | 0 | 1 | SBPA, SBPA+1 |
| N | 1 | 1 | SBPA+1 |

| Split Line? | AT, SBPA | AT, SBPA+1 | AT, ABPA+1 | Eligible Branch Predictions |
|---|---|---|---|---|
| Y | 0 | 0 | 0 | SBPA+1 |
| Y | 1 | 0 | 0 | SBPA+1 |
| Y | 0 | 1 | 0 | None (predict sequential) |
| Y | 1 | 1 | 0 | None (predict sequential) |
| Y | 0 | 0 | 1 | SBPA+1, ABPA+1 |
| Y | 1 | 0 | 1 | SBPA+1, ABPA+1 |
| Y | 0 | 1 | 1 | ABPA+1 |
| Y | 1 | 1 | 1 | ABPA+1 |
| N | 0 | 0 | 0 | SBPA |
| N | 1 | 0 | 0 | None (predict sequential) |
| N | 0 | 1 | 0 | SBPA, SBPA+1 |
| N | 1 | 1 | 0 | SBPA+1 |
| N | 0 | 0 | 1 | SBPA |
| N | 1 | 0 | 1 | None (predict sequential) |
| N | 0 | 1 | 1 | SBPA, SBPA+1 |
| N | 1 | 1 | 1 | SBPA+1 |

FIG. 7

BRANCH PREDICTION UNIT WHICH APPROXIMATES A LARGER NUMBER OF BRANCH PREDICTIONS USING A SMALLER NUMBER OF BRANCH PREDICTIONS AND AN ALTERNATE TARGET INDICATION

BACKGROUND OF THE INVENTION

1. Field of the Invention

This invention relates to the field of microprocessors and, more particularly, to branch prediction within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

An important feature of a superscalar microprocessor (and a superpipelined microprocessor as well) is its branch prediction mechanism. The branch prediction mechanism indicates a predicted direction (taken or not-taken) for a branch instruction, allowing subsequent instruction fetching to continue within the predicted instruction stream indicated by the branch prediction. A branch instruction is an instruction which causes subsequent instructions to be fetched from one of at least two addresses: a sequential address identifying an instruction stream beginning with instructions which directly follow the branch instruction; and a target address identifying an instruction stream beginning at an arbitrary location in memory. Unconditional branch instructions always branch to the target address, while conditional branch instructions may select either the sequential or the target address based on the outcome of a prior instruction. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

In order to be effective, the branch prediction mechanism must be highly accurate such that the predicted instruction stream is correct as often as possible. Typically, increasing the accuracy of the branch prediction mechanism is achieved by increasing the complexity of the branch prediction mechanism. For example, a cache-line based branch prediction scheme may be employed in which branch predictions are stored in association with a particular cache line of instruction bytes in an instruction cache. A cache line is a number of contiguous bytes which are treated as a unit for allocation and deallocation of storage space within the instruction cache. When instructions within the cache line are fetched by the microprocessor, the corresponding branch predictions are also fetched. Furthermore, when the particular cache line is discarded, the corresponding branch predictions are discarded as well. The cache line is aligned in memory.

A cache-line based branch prediction scheme may be made more accurate by storing a larger number of branch predictions for each cache line. A given cache line may include multiple branch instructions, each of which is represented by a different branch prediction. Therefore, more branch predictions allocated to a cache line allows for more branch instructions to be represented and predicted by the branch prediction mechanism. A branch instruction which cannot be represented within the branch prediction mechanism is not predicted, and subsequently a "misprediction" may be detected if the branch is found to be taken. As used herein, a "branch prediction" is a value which may be interpreted by the branch prediction mechanism as a prediction of whether or not a branch instruction is taken or not taken. Furthermore, a branch prediction may include the target address. For cache-line based branch prediction mechanisms, a prediction of a sequential line to the cache line being fetched is a branch prediction when no branch instructions are within the instructions being fetched from the cache line.

Unfortunately, increasing the number of branch predictions which may be stored for a given cache line increases the size of the branch prediction storage. The increased size occupies a larger area in the microprocessor, thereby leading to increased costs. Furthermore, the size increase may impact the frequency at which the microprocessor may operate.

SUMMARY OF THE INVENTION

The problems outlined above are in large part solved by a branch prediction unit in accordance with the present invention. The branch prediction unit includes a cache-line based branch prediction storage having a branch prediction storage location assigned to each cache line of an instruction cache within the microprocessor employing the branch prediction unit. Although each branch prediction storage location is assigned to a particular cache line, the branch prediction storage location stores an alternate target indication indicating whether a branch prediction within the storage location corresponds to a branch instruction within the cache line to which the storage location is assigned or to a branch instruction within a different cache line. The different cache line has a predetermined relationship to the cache line to which the storage location is assigned. In various embodiments, the different cache line is at an index one less than the index of the storage location or is within a different way of the same index.

The branch prediction unit described herein approximates having multiple branch predictions per cache line even though only one branch prediction storage location is assigned to the cache line. If multiple branch predictions are stored in a single storage location, even more than those multiple branch predictions may be represented for a given cache line by using multiple branch prediction storage locations. In cases in which a branch prediction would have been unused due to a lack of sufficient predicted-taken branch instructions within a cache line, the unused branch prediction may be used by a different cache line having a large number of branch instructions. Branch prediction accuracy may be increased due to the more efficient usage of the available branch prediction storage locations. Performance of a microprocessor employing the branch prediction unit may accordingly be increased. Furthermore, the increased branch prediction accuracy is provided with only a minor increase in storage within the branch prediction storage (i.e. storage for the alternate target indications). Advantageously, the area cost for the branch prediction storage increases minimally while the performance of the branch prediction unit may increases by a much larger amount.

Broadly speaking, the present invention contemplates a branch prediction unit comprising a branch prediction storage and a control unit. The branch prediction storage is configured to store branch prediction information. The branch prediction storage is coupled to receive a first fetch address corresponding to a first cache line within an instruction cache, and to provide a first branch prediction and a first alternate target indication from a first storage location within the branch prediction storage in response to the first fetch address. Furthermore, the branch prediction storage is configured to provide a second branch prediction and a second alternate target indication from a second storage location within the branch prediction storage in response to the first fetch address. The first storage location is assigned to the first cache line, and the second storage location is assigned to a second cache line. Coupled to receive the first branch prediction, the first alternate target indication, the second branch prediction, and the second alternate target indication from the branch prediction storage, the control unit is configured to generate a second fetch address. The control unit is configured to employ the first branch prediction in generating the second fetch address if the first alternate target indication is in a first state. Furthermore, the control unit is configured to employ the second branch prediction in generating the second fetch address if the second alternate target indication is in a second state different from the first state.

The present invention further contemplates a branch prediction unit comprising a branch prediction storage and a control unit. The branch prediction storage is configured to store branch prediction information, wherein each storage location within the branch prediction storage is assigned to a different instruction cache line and is configured to store a branch prediction and an alternate target indication. In a first storage location storing a first branch prediction and a first alternate target indication, the first alternate target indication indicates (in a first state) that the first branch prediction corresponds to a first branch instruction within a first instruction cache line to which the first storage location is assigned. Additionally, the first alternate target indication indicates (in a second state) that the first branch prediction corresponds to a second branch instruction within a second instruction cache line having a predefined relationship with the first instruction cache line within an instruction cache. Coupled to receive the first branch prediction and the first alternate target indication from the branch prediction storage responsive to a first fetch address identifying the first instruction cache line or a second fetch address identifying the second instruction cache line, the control unit is configured to generate a third fetch address for fetching instructions. The control unit is configured to analyze the first branch prediction in generating the third fetch address if the first fetch address is presented to the branch prediction storage and the first alternate target indication is in the first state, and wherein the control unit is configured to analyze the branch prediction in generating the third fetch address if the second fetch address is presented to the branch prediction storage and the first alternate target indication is in the second state.

Moreover, the present invention contemplates a method for generating a fetch address. A first branch prediction is read from a branch prediction storage, the first branch prediction being stored in a first storage location assigned to a first cache line being concurrently fetched from an instruction cache. A second branch prediction is read from the branch prediction storage, the second branch prediction being stored in a second storage location assigned to a second cache line. The fetch address is selected from a sequential address, the first branch prediction, and the second branch prediction. The first branch prediction is eligible for selection if a first alternate target indication corresponding to the first branch prediction is in a first state. Furthermore, the second branch prediction is eligible for selection if a second alternate target indication corresponding to the second branch prediction is in a second state different from the first state.

Still further, the present invention contemplates a superscalar microprocessor comprising an instruction cache and a branch prediction unit. The instruction cache is configured to provide a cache line of instruction bytes in response to a fetch address. Coupled to receive the fetch address concurrent with the instruction cache receiving the fetch address, the branch prediction unit is configured to generate a subsequent fetch address. The branch prediction unit is configured to analyze a first branch prediction corresponding to the cache line if a first alternate target indication corresponding to the first branch prediction is in a first state, and wherein the branch prediction unit is configured to analyze a second branch prediction corresponding to a different cache line if a second alternate target indication corresponding to the second branch prediction is in a second state different from the first state.

BRIEF DESCRIPTION OF THE DRAWINGS

Other objects and advantages of the invention will become apparent upon reading the following detailed description and upon reference to the accompanying drawings in which:

FIG. 5 is a truth table illustrating eligible branch predictions as determined by one embodiment of a prediction selection control unit shown in FIG. 4.

FIG. 7 is a truth table illustrating eligible branch predictions as determined by one embodiment of a prediction selection control unit shown in FIG. 6.

Figure 1:
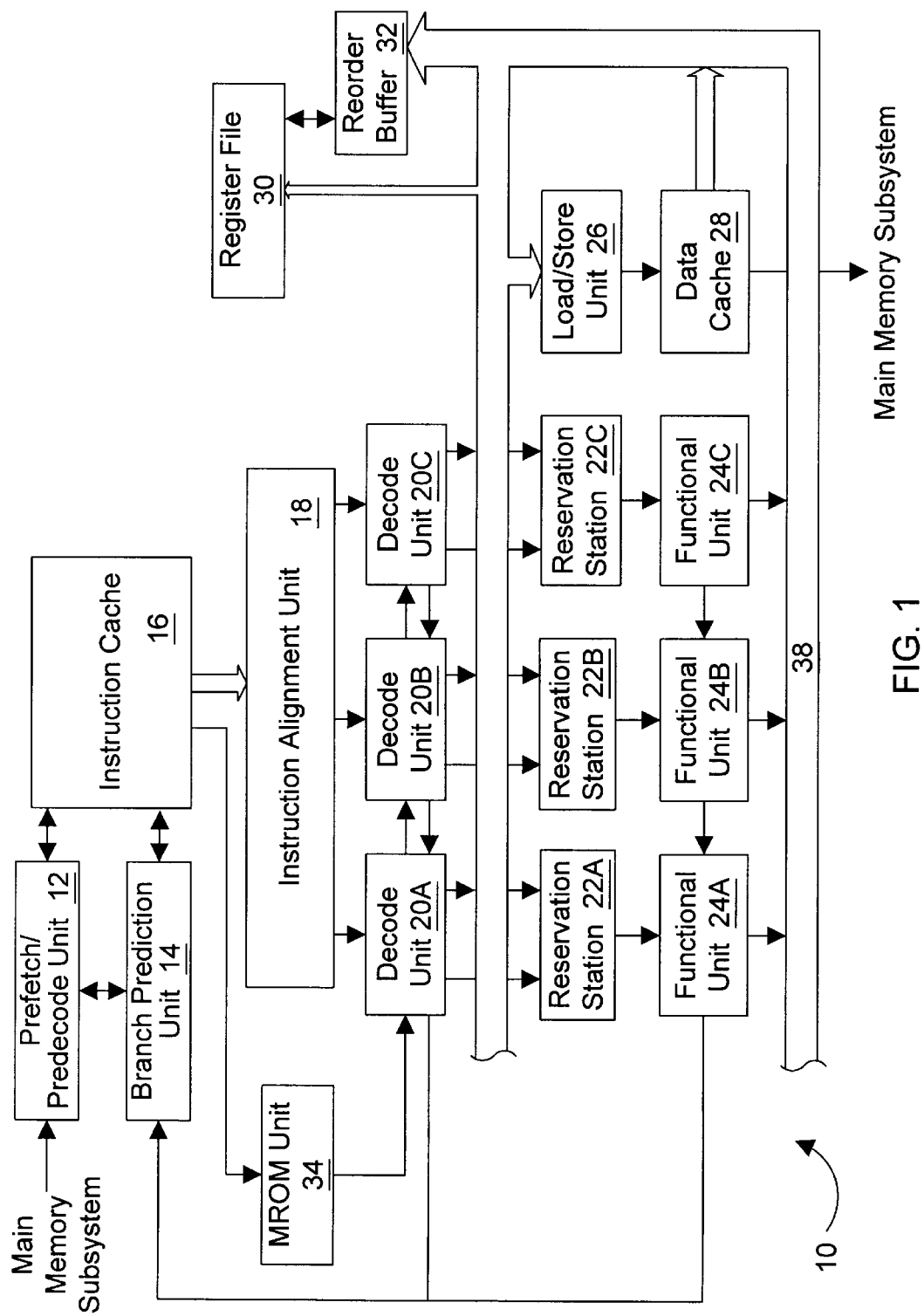
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, branch prediction unit 14 performs branch prediction in order to generate fetch addresses for instruction cache 16. During a particular clock cycle, the fetch address is provided to instruction cache 16 and branch prediction unit 14 generates a branch prediction (based upon the current fetch address) to be used as a fetch address in the ensuing clock cycle. Branch prediction unit 14 includes a branch prediction storage for storing branch predictions. The branch prediction storage is cache-line based (i.e. each storage location is assigned to a particular cache line within instruction cache 16). However, branch predictions corresponding to a fetched cache line may be stored either: (i) in the storage location assigned to the fetched cache line; or (ii) in another predetermined storage location. The predetermined storage location corresponds to a different cache line which has a predetermined relationship within the instruction cache to the fetched cache line. Advantageously, more branch predictions may be stored for a given cache line than the corresponding storage location in the branch prediction storage allows for. The branch prediction unit described herein takes advantage of unused branch prediction storage locations corresponding to other cache lines to store additional branch predictions for a cache line having a large number of branches. The other cache lines may be invalid, or may not contain a predicted-taken branch. In other words, branch prediction unit 14 approximates storing a larger number of branch predictions per cache line by making use of unused branch prediction storage locations. Branch prediction accuracy may be increased in situations in which formerly unused branch prediction storage locations are used for cache lines having more than the number of branch predictions which may be stored in a single storage location of the branch prediction storage.

In one embodiment, each of the branch prediction storage locations is configured to store one branch prediction. Additionally, the storage location stores an alternate target indication. In one state, the alternate target indication identifies the branch prediction as corresponding to a branch instruction within the cache line to which the storage location is assigned. In another state, the alternate target indication identifies the branch prediction as corresponding to a branch instruction within a different cache line. Branch prediction unit 14 uses the alternate target indication to determine whether or not a branch prediction within a particular storage location can be used to predict the fetch address for the following clock cycle. If the alternate target indication from the particular storage location is in the first state, the branch prediction from the particular storage location is analyzed as part of the branch prediction mechanism if the particular storage location is assigned to the cache line being fetched. Alternatively, if the alternate target indication from the particular storage location is in the second state, the branch prediction from the particular storage location is analyzed as part of the branch prediction mechanism if the particular storage location is not assigned to the cache line being fetched but is assigned to another cache line having a predetermined relationship to the cache line being fetched. A storage location selected in response to a cache line being fetched but which is not assigned to that cache line (i.e. a storage location assigned to a different cache line) is referred to herein as the "alternate storage location". Depending upon the embodiment, the alternate storage location may be the storage location at the next index to the index of the cache line being fetched, or may be a different storage location within the same index (e.g. a different way at the same index).

According to one embodiment, the branch prediction storage within branch prediction unit 14 is configured with the same geometry as instruction cache 16 (e.g. the same number of rows and columns of storage locations). For example, instruction cache 16 may be a 4 way set associative structure. The branch prediction storage is a 4 way set associative structure as well. Additionally, the branch prediction storage includes the same number of rows and is therefore indexed using the same portion of the fetch address used to index instruction cache 16. An index is a value used to select a row within an array such as instruction cache 16 or the branch prediction storage. In a set associative structure, a row includes multiple storage locations (e.g. cache line storage locations in instruction cache 12 or branch prediction storage locations in the branch prediction storage). Each storage location forms a different "way" of the row.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 | |
|---|---|---|
| End bits | | 00001 |
| Functional bits | 11000 | |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, a branch target address is stored with respect to each cache line in instruction cache 16. Prefetch/predecode unit 12 determines initial branch targets when a particular line is predecoded. Subsequent updates to the branch target corresponding to a cache line may occur due to the execution of instructions. Decode units 20 and functional units 24 provide update information to branch prediction unit 14. Some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
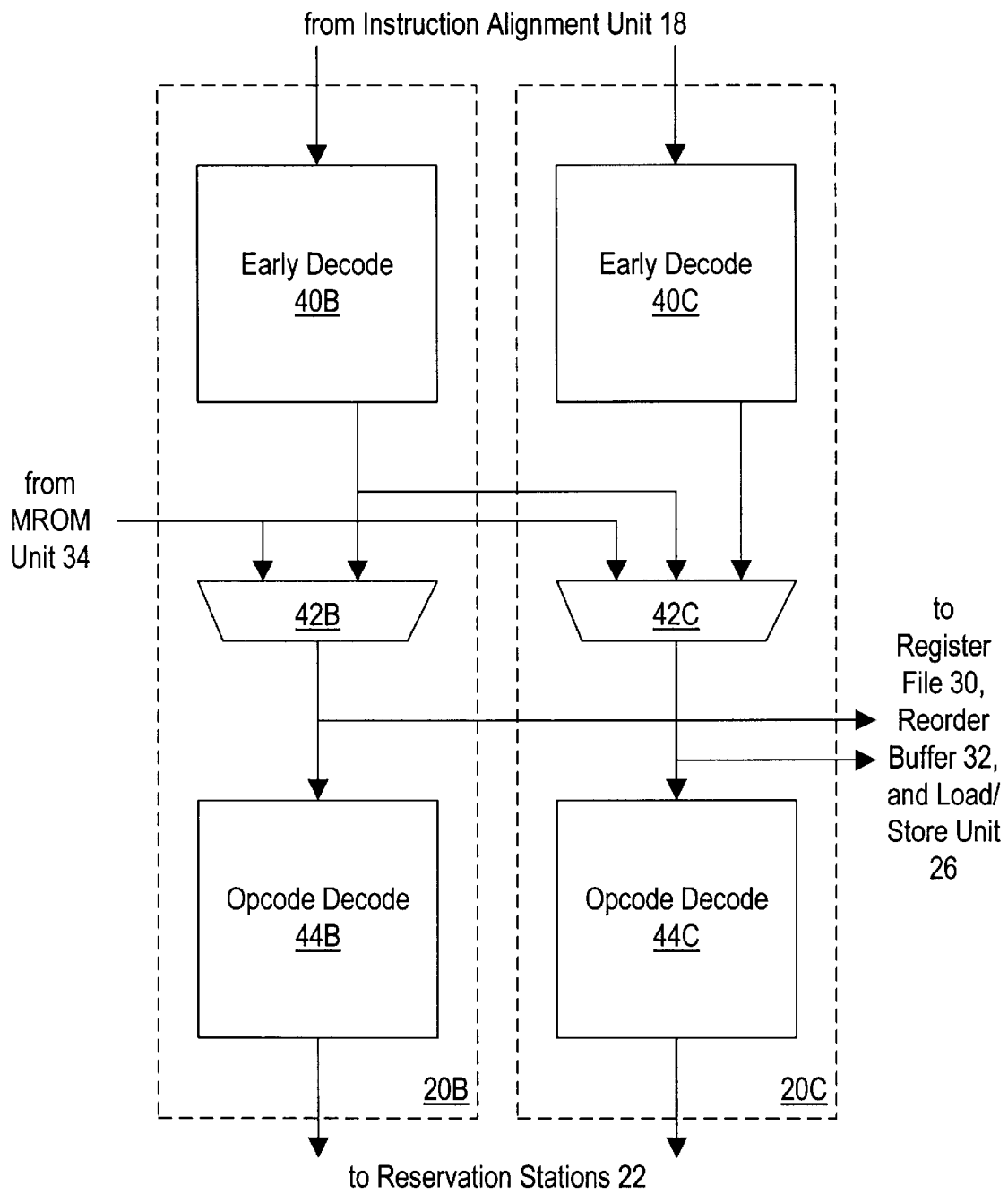
FIG. 2 is a block diagram of one embodiment of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
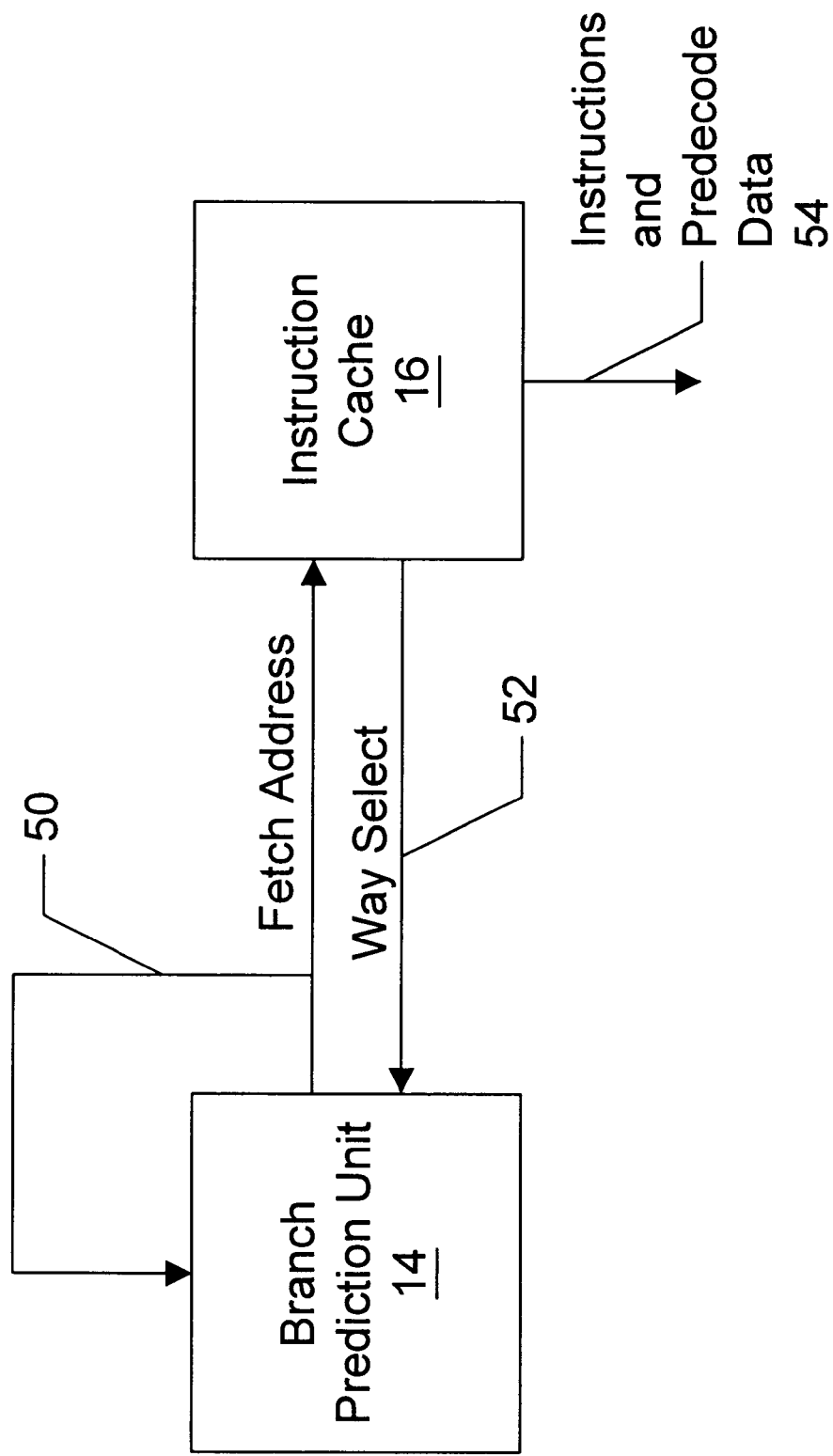
FIG. 3 is a block diagram of a branch prediction unit and an instruction cache shown in FIG. 1, illustrating interconnection therebetween according to one embodiment of the microprocessor.

Turning now to FIG. 3, a block diagram of branch prediction unit 14 and instruction cache 16 is shown, highlighting interconnection therebetween according to one embodiment of microprocessor 10. The interconnection shown is used for fetching instructions and forming branch predictions. Additional interconnection may be included as desired and for other purposes. Furthermore, interconnection between branch prediction unit 14, instruction cache 16, and other units of microprocessor 10 is not shown for clarity in the drawing. Any suitable interconnection may be used. A fetch address bus 50 is shown coupled to both branch prediction unit 14 and instruction cache 16, as well as a way select bus 52. Instructions and predecode data read from instruction cache 16 in response to the fetch address upon fetch address bus 50 are conveyed to instruction alignment unit 18 upon an instructions and predecode data bus 54 coupled to instruction cache 16.

Generally, branch prediction unit 14 conveys a fetch address upon fetch address bus 50. Instruction cache 16 indexes into its instruction storage using the fetch address, and selects a set of storage locations (one storage location from each way). Instruction cache 16 compares the tags identifying the cache lines stored in the selected storage locations to the fetch address to determine if the fetch address hits in instruction cache 16 and to select the way which is hit for conveying instruction bytes. Instruction cache 16 also conveys the selected way upon way select bus 52, thereby allowing branch prediction unit 14 to select branch predictions from a branch prediction storage included therein.

In addition to providing the fetch address to instruction cache 16, fetch address bus 50 feeds back as an input to branch prediction unit 14. The fetch address is used to index into the branch prediction storage, thereby selecting branch predictions for use in forming a subsequent fetch address. Based upon the alternate target indications and branch predictions, branch prediction unit 14 generates the subsequent fetch address. During the following clock cycle, the subsequent fetch address is conveyed to instruction cache 16 and is fed back to branch prediction unit 14.

Branch prediction unit 14 receives branch prediction update information from either: (i) prefetch/predecode unit 12, upon predecoding of a branch instruction; (ii) decode units 20, upon detecting an unconditional branch which was not predicted; and (iii) functional units 24 (or alternatively reorder buffer 32) upon detection of a branch misprediction. The update information may be provided and stored into the branch prediction storage within branch prediction unit 14 in any suitable manner.

Although described herein with respect to a set associative instruction cache (and corresponding set associative branch prediction storage), various of the embodiments shown herein may be implemented in a direct-mapped or fully associative configuration as well.

Figure 4:
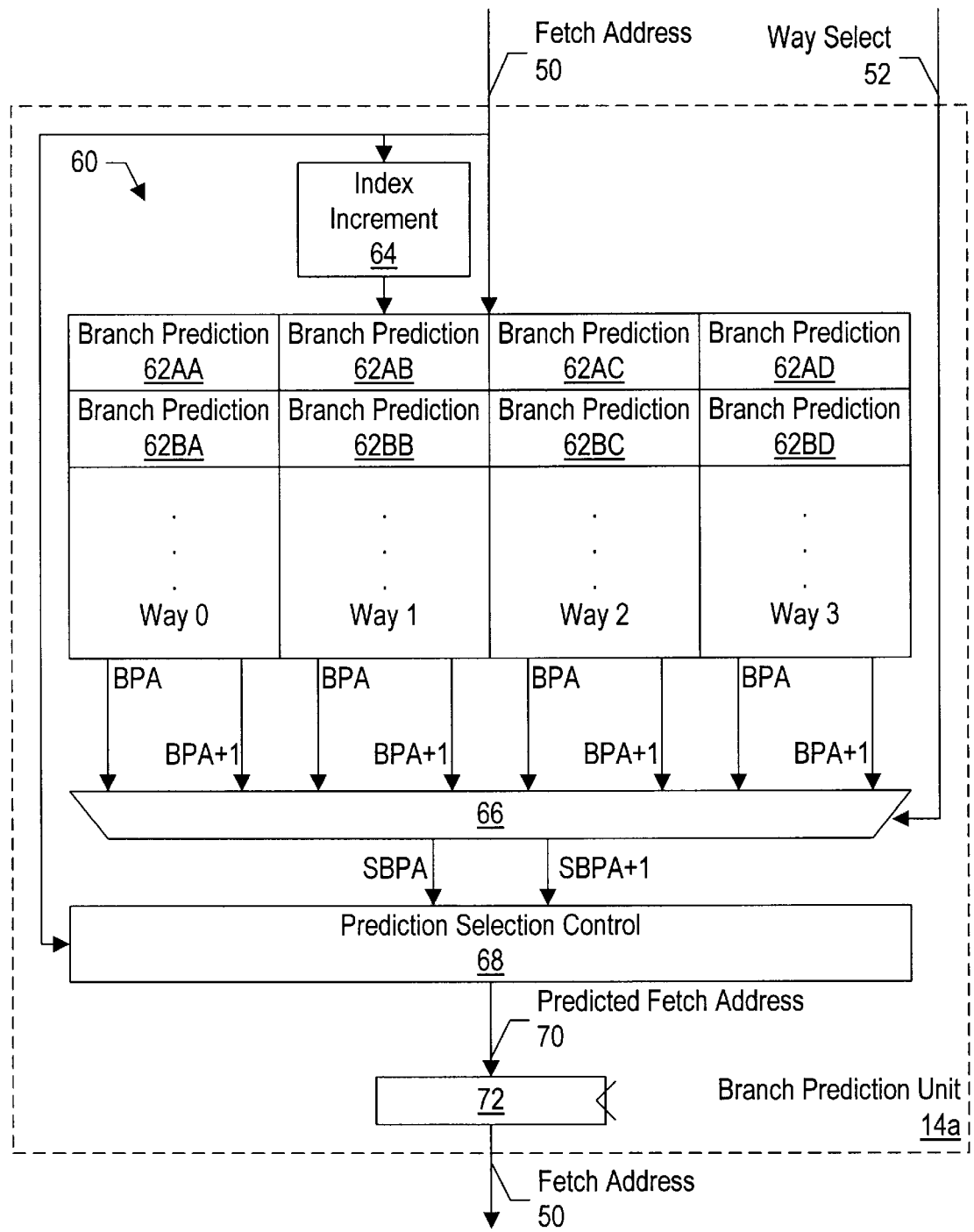
FIG. 4 is a block diagram of one embodiment of a branch prediction unit shown in FIG. 1.
Figure 10:
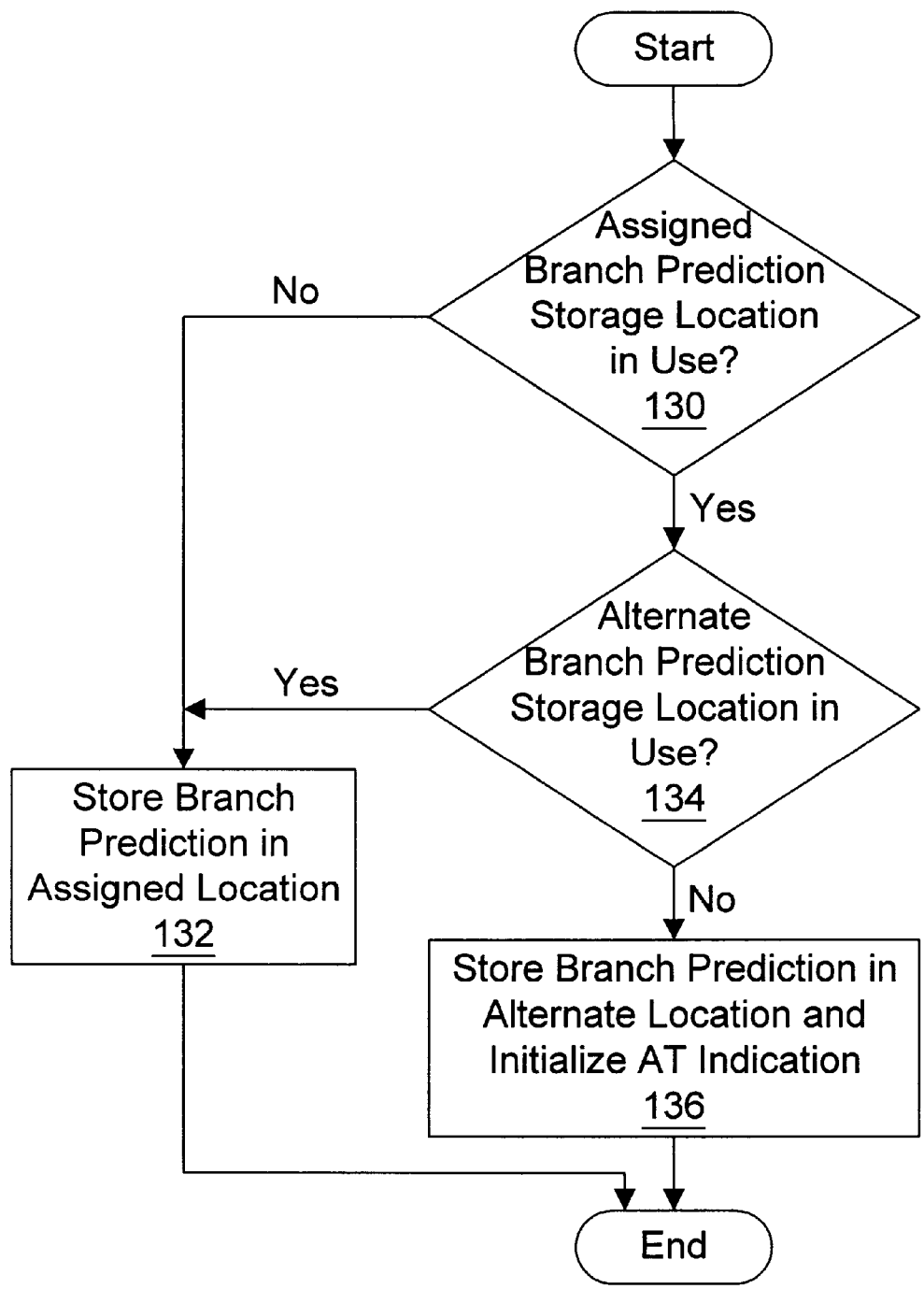
FIG. 10 is a flowchart illustrating selection of a storage location for a branch prediction according to one embodiment of the branch prediction unit shown in FIG. 1.

Turning next to FIG. 4, a block diagram of a first embodiment of branch prediction unit 14 (branch prediction unit 14a) is shown. The portion of branch prediction unit 14a shown in FIG. 4 illustrates the formation of fetch addresses . . . circuitry for updating branch prediction unit 14a is not shown for clarity in the drawing. Any suitable update mechanism may be used. An exemplary update method is shown below (FIG. 10). Branch prediction unit 14a includes a branch prediction storage 60. Branch prediction storage 60 comprises a plurality of storage locations including storage locations 62AA–62BD. Storage locations 62AA–62AD form a first set accessed via a first index derived from the fetch address, while storage locations 62BA–62BD form a second set indexed by a second index. The storage locations within branch prediction storage 60 will be generically referred to as storage locations 62, which includes storage locations 62AA–62BD and other storage locations (not shown). Each of the storage locations within a set is assigned to a different way, in the same fashion as instruction cache 16. For example, storage location 62AA is in way 0 of the first index, and is therefore assigned to the cache line stored in way 0 of the first index of instruction cache 16. If that cache line does not include a predicted-taken branch, storage location 62AA may be used, via the alternate target indication, for a different cache line within instruction cache 16. Other storage locations 62 are configured similarly.

Branch prediction storage 60 additionally includes an index increment block 64. Index increment block 64 increments the index portion of the fetch address provided on fetch address bus 50 by one. In other words, the fetch address is effectively incremented by one index. The output of index increment block 64 is coupled to branch prediction storage 60, as is fetch address bus 50. Therefore, two sets within branch prediction storage 60 are accessed in response to a fetch address upon fetch address bus 50. The two sets are the set indexed by the fetch address and the set which is stored at the index one greater than the index derived from the fetch address. Branch prediction storage 60 provides the branch prediction and associated alternate target indication stored in each storage location 62 of the set indexed by the fetch address to a multiplexor 66 (illustrated as the BPA output from each way of branch prediction storage 60). Additionally, branch prediction storage 60 provides the branch prediction and associated alternate target indication stored in each storage location 62 of the set indexed by the output of index increment block 64 to multiplexor 66 as well (illustrated as the BPA+1 output from each way of branch prediction storage 60).

Multiplexor 66 receives the selected way from instruction cache 16 upon way select bus 52. The branch predictions BPA and BPA+1 from the selected way are selected by multiplexor 66 and provided (as SBPA and SPBA+1, respectively) to a prediction selection control unit 68. Control unit 68 analyzes the provided branch predictions and forms a predicted fetch address 70, which is stored into storage device 72 (e.g. a latch or a register) for conveyance upon fetch address bus 50 during the following clock cycle. Branch predictions stored in branch prediction storage 60 have a corresponding alternate target indication. In a first state, the alternate target indication identifies the branch prediction as corresponding to a branch instruction within the cache line to which the storage location storing that branch prediction is assigned. In a second state, the alternate target indication identifies the branch prediction corresponding to a branch instruction within a different cache line than the cache line to which the storage location storing that branch prediction is assigned. In the embodiment of FIG. 4, a storage location can be used to store a branch prediction for the corresponding cache line, or a branch prediction for the cache line which is within the same way of instruction cache 16 but is at one index less than the index of the storage location 62.

For example, storage location 62BA may be used to store a branch prediction corresponding to the cache line within way 0 of instruction cache 16 at the second index, or storage location 62BA may be used to store a branch prediction corresponding to the cache line stored within way 0 at the first index (i.e. the cache line to which storage location 62AA is assigned). In other words, a branch prediction for the cache line corresponding to storage location 62AA may be found within storage location 62AA or storage location 62BA.

The branch prediction SBPA is the branch prediction from the storage location 62 assigned to the cache line identified by the fetch address. Therefore, the branch target address within branch prediction SBPA is eligible for selection as predicted fetch address 70 (i.e. branch prediction SBPA is an eligible branch prediction corresponding to a branch instruction within the cache line identified by the fetch address) if the alternate target indication corresponding to branch prediction SBPA is in the first state. Alternatively, the branch prediction SBPA+1 is the branch prediction from the storage location 62 which is within the same way as branch prediction SBPA but is stored at one index greater than the branch prediction SBPA. The branch target address within branch prediction SBPA+1 is eligible for selection as predicted fetch address 70 (i.e. branch prediction SBPA+1 is an eligible branch prediction) if the alternate target indication corresponding to branch prediction SBPA+1 is in the second state.

Control unit 68 analyzes the eligible branch predictions with respect to the fetch address and generates predicted fetch address 70. Generally, control unit 68 selects the first predicted-taken branch prediction corresponding to a branch instruction which is subsequent to the byte being fetched within the cache line (as identified by the fetch address upon fetch address bus 50). The first predicted-taken branch prediction corresponds to a branch instruction which is prior to the other branch instructions having predicted-taken branch predictions (if any) within the cache line. In other words, the first branch instruction encountered within the cache line after the byte indicated by the fetch address and which is represented by an eligible predicted-taken branch prediction is selected as predicted fetch address 70. In one embodiment, the offset within the cache line of the branch instruction corresponding to the branch prediction is stored in the branch prediction. The offset can be compared to the fetch address offset to select the branch prediction. If none of the eligible branch predictions is subsequent to the byte indicated by the fetch address or if none of the eligible branch predictions is predicted-taken, then the sequential address (i.e. the fetch address plus one index) is selected as predicted fetch address 70.

According to one embodiment of microprocessor 10, the instruction set executed by microprocessor 10 is a variable byte length instruction set (e.g. the x86 instruction set). Such an instruction set allows for a single instruction to be split across two consecutive cache lines (i.e. the first byte or bytes of the instruction are within the first cache line and the remaining byte or bytes are within the second cache line). When a split line access is performed, the incremented fetch address is the address for which branch predictions are desired (since the first instruction being fetched includes the last few bytes of the first cache line, there is no branch instruction between the first instruction and the end of the cache line). In this case, control unit 14 ignores the branch prediction SBPA and uses the branch prediction SBPA+1, assuming that the alternate target indication for branch prediction SBPA+1 is in the first state.

Branch prediction unit 14a advantageously approximates having more branch predictions per cache line than a single storage location 62 provides by making use of other storage locations 62 which are not storing branch predictions for the cache lines to which they are assigned. Storage locations 62 which might previously have gone unused may be used to store a branch prediction. Branch prediction accuracy may thereby be increased without increasing the size of branch prediction storage 60. Performance of microprocessor 10, when employing branch prediction unit 14a, may thereby be increased.

According to one embodiment of branch prediction unit 14a, the alternate target indication is a bit. The first state is the bit being clear, and the second state is the bit being set. It is noted that, while each storage location 62 has been described above as storing one branch prediction, several branch predictions may be stored in each storage location 62. Furthermore, each branch prediction within a storage location may include a separate alternate target indication allowing for certain branch predictions within a storage location to serve the assigned cache line while others may be alternate targets for a different cache line. It is further noted that an alternative embodiment of branch prediction unit 14a may be configured to select different ways for providing branch prediction SBPA and branch prediction SBPA+1. In such an embodiment, way select bus 52 may be configured to provide two selected ways (one for the index derived from the fetch address, and one for the fetch address incremented by one index).

Turning now to FIG. 5, a truth table 80 illustrating selection of eligible branch predictions for use in generating predicted fetch address 70 is shown according to one embodiment of branch prediction control unit 68. Truth table 80 includes a column 82 indicating whether or not the fetch is a split line access (indicating Y for yes and N for no), a column 84 indicating the alternate target bit for branch prediction SBPA, a column 86 indicating the alternate target bit for branch prediction SBPA+1, and a result column 88 indicating which branch predictions are eligible. If no branch predictions are eligible, a sequential prediction is generated. A sequential prediction may also be generated if the eligible branch predictions identify branch instructions which are prior to the offset of the fetch address within the cache line, or are set to a not-taken prediction.

Figure 6:
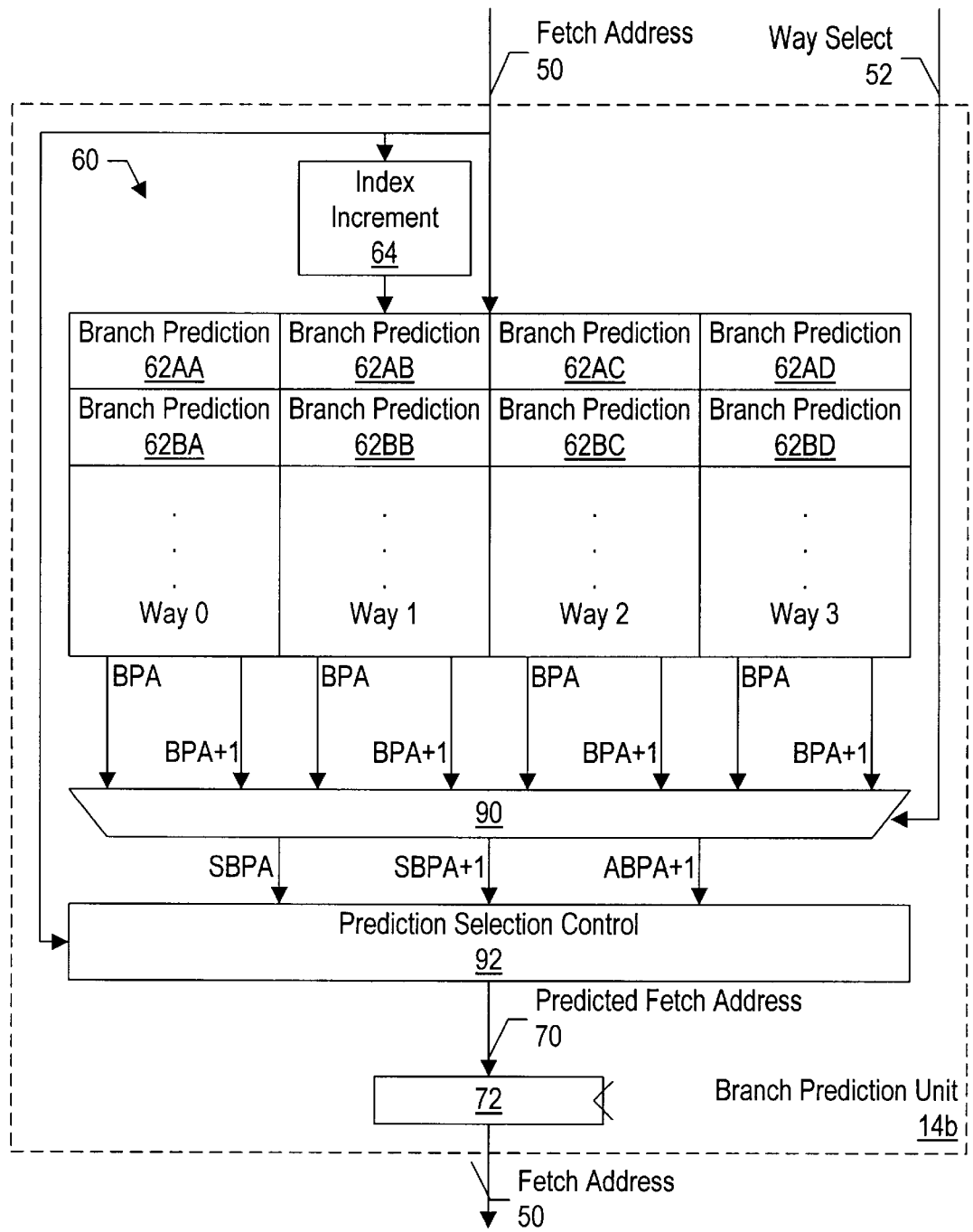
FIG. 6 is a block diagram of a second embodiment of the branch prediction unit shown in FIG. 1.

Turning now to FIG. 6, a block diagram of a second embodiment of branch prediction unit 14 (branch prediction unit 14b) is shown. Similar to branch prediction unit 14a shown in FIG. 4, branch prediction unit 14b includes branch prediction storage 60 including storage locations 62 (such as storage locations 62AA–62BD) and index increment block 64. Branch prediction storage 60 produces a set of branch predictions based upon the fetch address (shown as branch predictions BPA from each way of branch prediction storage 60) and the fetch address incremented by one index (shown as branch predictions BPA+1 from each way of branch prediction storage 60). However, a multiplexor 90 is provided which selects three of the provided branch predictions for consideration by a prediction selection control unit 92. Prediction selection control unit 92 forms predicted fetch address 70 based upon eligible ones of the branch predictions selected by multiplexor 90 responsive to the way selected for the fetch address. Predicted fetch address 70 is stored in storage device 72 for conveyance upon fetch address bus 50 during the succeeding clock cycle.

Branch prediction unit 14b provides enhanced branch prediction storage for split line accesses, as compared to branch prediction unit 14a shown in FIG. 4. Multiplexor 90 selects the branch predictions BPA and BPA+1 stored within the selected way conveyed upon way select bus 52 as SBPA and SBPA+1, respectively (as with multiplexor 66 in FIG. 4). Additionally, multiplexor 90 selects an additional branch prediction from branch predictions BPA+1 (illustrated as ABPA+1). The additional branch prediction may be used to store a branch prediction for the split line access, similar to the manner in which SBPA+1 may store a branch prediction for a cache line to which the storage location 62 storing branch prediction SBPA is assigned.

According to one embodiment, branch prediction ABPA+1 is the branch prediction BPA+1 stored in the next consecutive way to branch prediction SBPA+1. As used herein, a first way is consecutive to a second way if it is logically adjacent to the second way and is identified by a way value one greater than the second way. The way value is a number used to select a particular way (e.g. 0–3 as shown in FIG. 6). Therefore, way 1 is consecutive to way 0, way 2 is consecutive to way 1, etc. The last way in the row (i.e. having the largest way value) has as its consecutive way the first way in the row. In FIG. 6, for example, way 0 is consecutive to way 3.

For non-split line accesses, the branch target address of branch prediction SBPA is eligible for forming predicted fetch address 70 (i.e. branch prediction SBPA is an eligible branch prediction) if the alternate target indication corresponding to branch prediction SBPA is in the first state, and the branch target address of branch prediction SBPA+1 is eligible (i.e. the branch prediction SBPA+1 is an eligible branch prediction) if the alternate target indication corresponding thereto is in the second state. Branch prediction ABPA+1 is ineligible for forming a branch prediction for non-split line accesses.

For split line accesses, branch target SBPA is ineligible for forming predicted fetch address 70 (as discussed above). The branch target address of branch prediction SBPA+1 is eligible for forming predicted fetch address 70 (i.e. branch prediction SBPA+1 is an eligible branch prediction) if the corresponding alternate target indication is in the first state. The branch target address of branch prediction ABPA+1 is eligible for forming predicted fetch address 70 (i.e. branch prediction ABPA+1 is an eligible branch prediction) if the corresponding alternate target indication is in the second state.

From another view point, a branch prediction corresponding to a cache line may be found in one of three storage locations, depending upon whether or not a split-line access is being performed. The storage location assigned to the cache line may store a branch prediction for the cache line. The storage location within the same way as the storage location assigned to the cache line and at an index one greater than the index of the cache line may store a branch prediction for the cache line. Still further, the storage location in the consecutive way and at the same index as the storage location assigned to the cache line may store a branch prediction for the cache line.

Branch prediction unit 14b expands the number of branch predictions which may be stored for a given cache line without expanding the size of the branch prediction storage, as with branch prediction unit 14a. Furthermore, the expansion is available even in the case of split line accesses.

According to one embodiment, the alternate target indications each comprise one bit. The bit being set indicates the first state while the bit being clear indicates the second state. It is noted that, while each storage location 62 has been described above as storing one branch prediction, several branch predictions may be stored in each storage location 62. Furthermore, each branch prediction within a storage location may include a separate alternate target indication allowing for certain branch predictions within a storage location to serve the assigned cache line while others may be alternate targets for a different cache line. It is further noted that an alternative embodiment of branch prediction unit 14b may be configured to select different ways for providing branch prediction SBPA and branch prediction SBPA+1. In such an embodiment, way select bus 52 may be configured to provide two selected ways (one for the index derived from the fetch address, and one for the fetch address incremented by one index).

Turning next to FIG. 7, a truth table 100 illustrating selection of eligible branch predictions for use in generating predicted fetch address 70 is shown according to one embodiment of branch prediction control unit 92. Truth table 100 includes a column 102 indicating whether or not the fetch is a split line access (indicating Y for yes and N for no), a column 104 indicating the alternate target bit for branch prediction SBPA, a column 106 indicating the alternate target bit for branch prediction SBPA+1, a column 108 indicating the alternate target bit for branch prediction ABPA+1, and a result column 110 indicating which branch predictions are eligible. If no branch predictions are eligible, a sequential prediction is generated. A sequential prediction may also be generated if the eligible branch predictions identify branch instructions which are prior to the offset of the fetch address within the cache line, or are set to a not-taken prediction.

Figure 8:
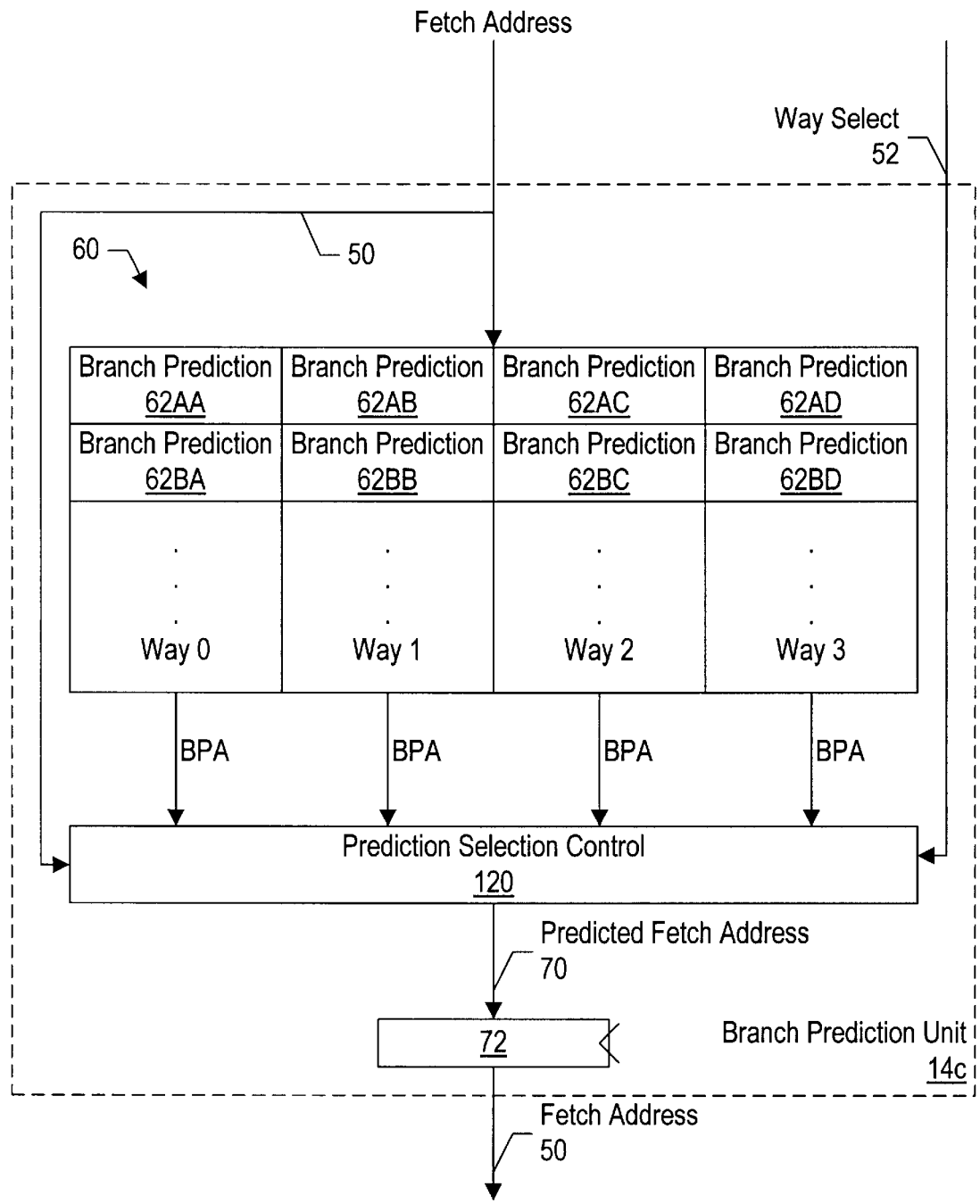
FIG. 8 is a block diagram of a third embodiment of the branch prediction unit shown in FIG. 1.

Turning now to FIG. 8, a block diagram of a third embodiment of branch prediction unit 14 (branch prediction unit 14c) is shown. Branch prediction unit 14c includes branch prediction storage 60, including storage locations 62 such as storage locations 62AA–62BD, and a prediction selection control unit 120. In contrast to branch prediction units 14a and 14b, branch prediction unit 14c accesses one set of branch prediction storage 60 in response to a fetch address upon fetch address bus 50. Each of the branch predictions stored in the accessed set is provided at the output of branch prediction storage 60 (illustrated as the BPA outputs in FIG. 8). Control unit 120 receives the BPA branch predictions and determines which of the BPA branch predictions are eligible branch predictions for use in forming predicted fetch address 70. From the eligible branch predictions, control unit 120 forms predicted fetch address 70, which is stored in storage device 72 for conveyance as the fetch address upon fetch address bus 50 during a subsequent clock cycle.

Branch prediction unit 14c employs way values as the alternate target indication. The way value coded into the alternate target indication identifies in which way the branch instruction corresponding to the branch prediction is stored. The selected way provided upon way select bus 52 is compared to the alternate target indication to determine if the branch prediction is eligible for use in forming predicted fetch address 70.

As mentioned above, multiple branch predictions may be stored in storage locations 62 in various embodiments. Additionally, it may be advantageous in branch prediction unit 14c to limit the number of alternate storage locations which may be used by a particular cache line, in order to allow for a more even distribution of storage locations 62 among the cache lines which have access to those storage locations. For the embodiment shown in FIG. 8, the first state of the alternate target indication may be the way value corresponding to the cache line to which the storage location is assigned, and the second state may be a different way in which the branch instruction corresponding to the branch prediction currently stored in the storage location. In other words, if the branch prediction is for a branch instruction in the cache line to which the storage location is assigned, the branch prediction is not an alternate prediction. If the branch prediction is for a branch instruction in a different cache line than the cache line to which the storage location is assigned, the branch prediction is an alternate prediction.

Figure 9:
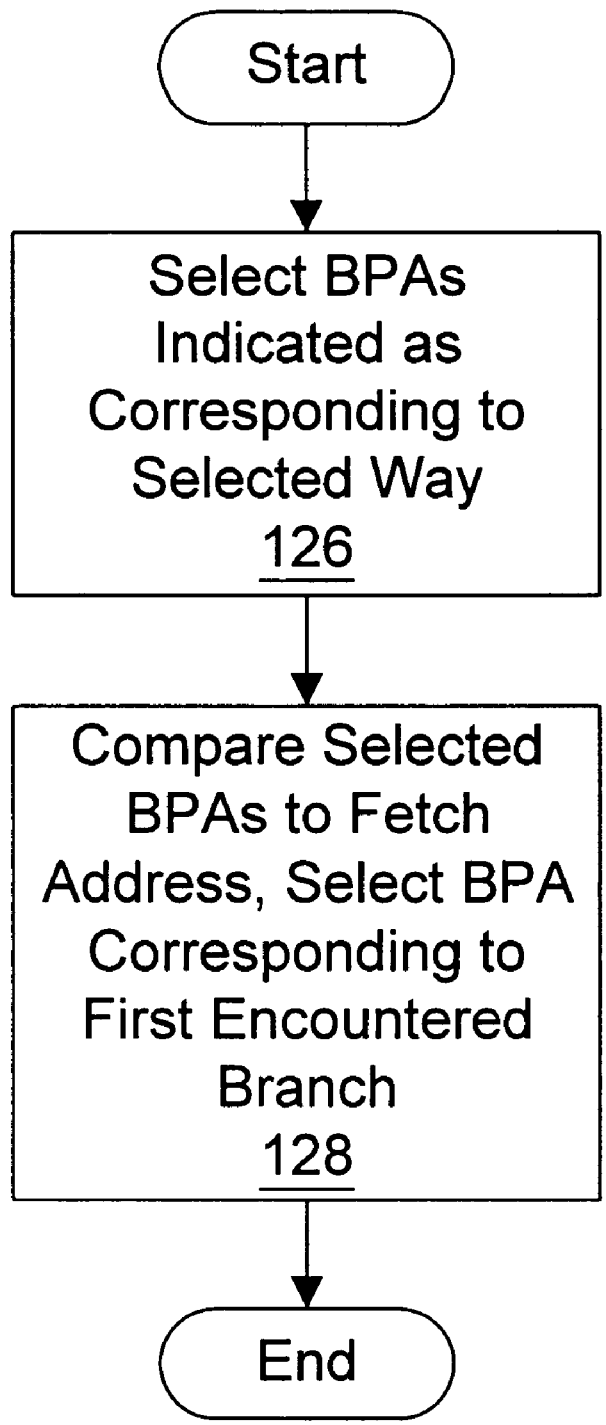
FIG. 9 is a flowchart illustrating operation of one embodiment of a prediction selection control unit shown in FIG. 8.

Turning next to FIG. 9, a flowchart illustrating the selection of eligible branch predictions and forming a predicted fetch address 70 therefrom according to one embodiment of control unit 120 is shown. Control unit 120 compares the alternate target indication for each of the BPA branch predictions to the selected way, and selects those BPA branch predictions for which the alternate target indication equals the selected way (step 126). The selected BPA branch predictions are then used to develop a predicted fetch address (i.e. by selecting the BPA branch prediction corresponding to the first-encountered predicted-taken branch instruction after the offset of the fetch address within the cache line—step 128).

Turning now to FIG. 10, a flowchart illustrating selection of a branch prediction storage location for storing a newly generated branch prediction is shown. The method shown in FIG. 10 may be used by any one of the embodiments shown in FIGS. 4, 6, and 8, as well as other embodiments. A newly generated branch prediction may be generated upon predecode of a cache line, or in response to a branch misprediction. Branch prediction unit 14 reads each of the branch prediction storage locations which can be used to store branch predictions for the cache line containing the branch instruction corresponding to the newly generated branch prediction. More particularly, the storage location assigned to the cache line containing the branch instruction is read. In addition, the alternate storage location(s) corresponding to the cache line is read. In the embodiment of FIG. 4, the alternate storage location is the storage location at the index one greater than the index derived from the fetch address of the branch instruction and within the same way as the cache line containing the branch instruction. In the embodiment of FIG. 6, the above-mentioned alternate storage location is read in addition to the storage location of the consecutive way at the same index as the fetch address of the branch instruction. Finally, in the embodiment of FIG. 8, the storage locations at the index of the fetch address of the branch instruction are each read.

Branch prediction unit 14 determines if the branch prediction storage location assigned to the cache line is in use (either for that cache line or as an alternate storage location for a different cache line—decision block 130). If the assigned storage location is not in use, then the newly generated branch prediction is stored into the assigned storage location. The alternate target indication is set to the first state (step 132).

Alternatively, the branch prediction storage location assigned to the cache line may be occupied by a valid branch prediction. In this case, branch prediction unit 14 determines if the alternate branch prediction storage location is occupied (decision block 134). If the alternate branch prediction storage location is not in use, then branch prediction unit 14 stores the newly generated branch prediction into the alternate branch prediction storage location (step 136). The alternate target indication is initialized to the second state. If both the assigned branch prediction storage location and the alternate branch prediction storage location are in use, then the assigned branch prediction storage location is used to store the newly generated branch prediction (step 132).

While the steps shown in the above flowchart are shown serially for ease of understanding, it is noted that the steps may be performed in parallel or in any order to accomplish storage of the newly generated branch prediction.

Figure 11:
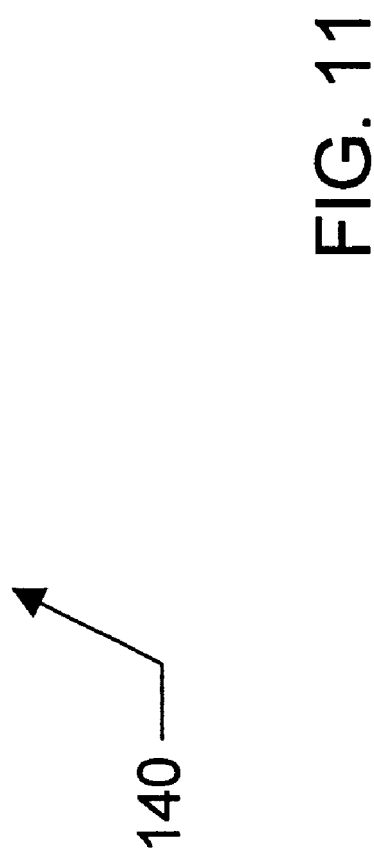
FIG. 11 is a diagram illustrating exemplary branch prediction information used according to one embodiment of the branch prediction unit shown in FIG. 1.

Turning now to FIG. 11, a diagram illustrating exemplary branch prediction information 140 is shown. Branch prediction information 140 may be implemented by any of the branch prediction unit embodiments described herein, as well as any other embodiments. Branch prediction information 140 includes a branch target address field 142, a valid bit 144, a call bit 146, a prediction counter field 148, an offset field 150, and an alternate target indication field 152.

Branch target address field 142 stores the branch target address corresponding to the branch instruction predicted by branch prediction information 140. In one embodiment, only the index and offset portions of the branch target address are stored. The tag of cache line selected in response to the branch prediction is concatenated with the contents of branch target address field 142 and is used as the predicted target address. The prediction is verified upon execution of the branch instruction. In another embodiment, the entire branch target address is stored.

Valid bit 144 indicates, when set, that branch prediction information 140 includes a valid branch prediction. When clear, branch prediction information 140 is invalid.

Call bit 146 indicates, when set, that the branch instruction corresponding to branch prediction information 140 is a subroutine call instruction. The address of the subroutine call instruction may be stored in a return stack structure for use by subroutine return instructions. When clear, call bit 146 indicates that the corresponding branch instruction is not a subroutine call instruction.

Prediction counter field 148 stores a prediction counter used to generate a taken/not-taken prediction. The counter saturates at its largest and smallest values. Each correct taken or incorrect not-taken prediction causes an increment of the prediction counter. Each correct not-taken prediction or incorrect taken prediction causes a decrement of the prediction counter. The most significant bit of the prediction counter is used as a taken (most significant bit set) or not-taken (most significant bit clear) prediction.

Offset field 150 stores the offset of the branch instruction corresponding to branch prediction 140 within the cache line. Offset field 150 can be compared to the fetch address used to fetch the cache line, in order to determine if the branch instruction corresponding to branch prediction information 140 is encountered within the instructions being fetched. In other words, offset field 150 is used to determine if the branch instruction is prior to or subsequent to the byte within the cache line which is identified by the fetch address. Additionally, in the case that multiple branch predictions are eligible for predicting a subsequent fetch address, the corresponding offset fields can be used to select the first encountered branch within the cache line.

Alternate target indication field 152 is used to store the alternate target indication. The alternate target indication may comprise a bit, for example, in certain embodiments of branch prediction units 14a and 14b. Alternatively, the alternate target indication may comprise a multiple bit value such as a way value. Any encoding of the alternate target indication which can be placed at least into the first and second states as described above may be used.

Figure 12:
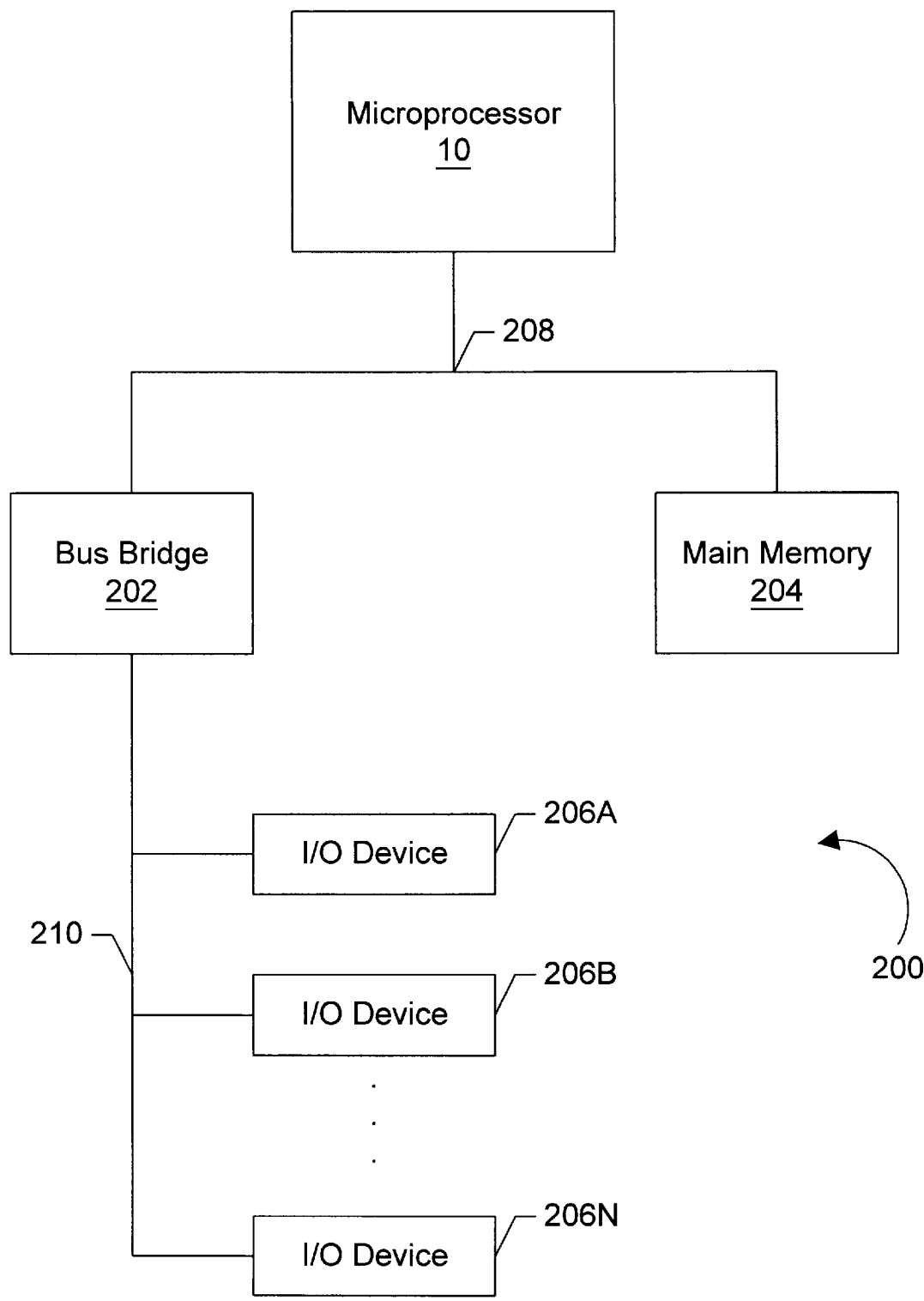
FIG. 12 is a block diagram of one embodiment of a computer system including the microprocessor shown in FIG. 1.

Turning now to FIG. 12, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 12 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is noted that, although single multiplexors are depicted in FIGS. 4, 6, and 8 for clarity in the drawing, multiple multiplexors or other selection devices may be implemented in cascade or parallel to provide the selection function.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |

TABLE 1-continued x86 Fast Path, Double Dispatch, and MROM Instructions

| X86 Instruction | Instruction Category |
|---|---|
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MkOM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| RBPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

In accordance with the above disclosure, a microprocessor configured to approximate storing a larger number of branch prediction per cache line than a branch prediction storage provides has been described. When a branch prediction corresponding to a particular cache line is not in use, it may be used as an alternate storage location for a different cache line. Additional branch prediction storage locations are thereby made available to cache lines without increasing the total number of branch predictions stored within the branch prediction storage. Performance may be increased through the increased accuracy of branch prediction.

Numerous variations and modifications will become apparent to those skilled in the art once the above disclosure is fully appreciated. It is intended that the following claims be interpreted to embrace all such variations and modifications.

What is claimed is:

1. A branch prediction unit comprising:
    a branch prediction storage configured to store branch prediction information, wherein said branch prediction storage is coupled to receive a first fetch address corresponding to a first cache line within an instruction cache, and wherein said branch prediction storage is configured to provide a first branch prediction, said first branch prediction including a first branch target address, and a first alternate target indication from a first storage location within said branch prediction storage in response to said first fetch address, and wherein said branch prediction storage is further configured to provide a second branch prediction, said second branch prediction including a second branch target address, and a second alternate target indication from a second storage location within said branch prediction storage in response to said first fetch address, and wherein said first storage location is assigned to said first cache line, and wherein said second storage location is assigned to a second cache line, and wherein said first alternate target indication is indicative, in a first state, that said first branch target address corresponds to a first branch instruction within said first cache line, and wherein said first alternate target indication is indicative, in a second state, that said first branch target address corresponds to a second branch instruction within a different cache line from said first cache line, and wherein said second alternate target indication is indicative, in said first state, that said second branch target address corresponds to a third branch instruction within said second cache line, and wherein said second alternate target indication is indicative, in said second state, that said second branch target address corresponds to a fourth branch instruction within said first cache line; and
    a control unit coupled to receive said first branch prediction, said first alternate target indication, said second branch prediction, and said second alternate target indication from said branch prediction storage, wherein said control unit is configured to select a second fetch address from one or more sources, and wherein said first branch target address is a first source of said one or more sources if said first alternate target indication is in said first state, and wherein said second branch target address is a second source of said one or more sources if said second alternate target indication is in said second state.

2. The branch prediction unit as recited in claim 1 wherein said control unit is configured to ignore said first branch prediction in selecting said second fetch address if said first alternate target indication is in said second state.

3. The branch prediction unit as recited in claim 2 wherein said control unit is configured to ignore said second branch prediction in selecting said second fetch address if said second alternate target indication is in said first state.

4. The branch prediction unit as recited in claim 1 wherein said first branch prediction is stored within said branch prediction storage at a first index derived from said first fetch address.

5. The branch prediction unit as recited in claim 4 wherein said second branch prediction is stored within said branch prediction storage at a second index which is numerically one greater than said first index.

6. The branch prediction unit as recited in claim 5 wherein said branch prediction storage is set associative.

7. The branch prediction unit as recited in claim 6 wherein said first branch prediction and said second branch prediction are stored in a same way of said branch prediction storage.

8. The branch prediction unit as recited in claim 7 wherein said first alternate target indication and said second alternate target indication each comprise a bit, and wherein said first state is said bit being clear, and wherein said second state is said bit being set.

9. The branch prediction unit as recited in claim 1, wherein said branch prediction storage is set associative.

10. The branch prediction unit as recited in claim 9 wherein said first branch prediction and said second branch prediction are stored within said branch prediction storage at a same index, and wherein said first branch prediction is stored in a first way and said second branch prediction is stored in a second way.

11. The branch prediction unit as recited in claim 10 wherein said first alternate target indication indicates said first way in said first state, and wherein said second alternate target indication indicates said first way in said second state.

12. The branch prediction unit as recited in claim 1 wherein said first storage location is configured to store a first plurality of branch predictions including said first branch prediction, and wherein said second storage location is configured to store a second plurality of branch predictions including said second branch prediction.

13. The branch prediction unit as recited in claim 12 wherein said first storage location is further configured to store a first plurality of alternate target indications corresponding to said first plurality of branch predictions, and wherein said second storage location is further configured to store a second plurality of alternate target indications corresponding to said second plurality of storage locations.

14. A branch prediction unit comprising:
    a branch prediction storage configured to store branch prediction information, wherein each storage location within said branch prediction storage is assigned to a different instruction cache line and is configured to store a branch prediction and an alternate target indication, and wherein, in a first storage location storing a first branch prediction, said first branch prediction including a first branch target address, and a first alternate target indication, said first alternate target indication indicates, in a first state, that said first branch prediction corresponds to a first branch instruction within a first instruction cache line to which said first storage location is assigned, and wherein said first alternate target indication indicates, in a second state, that said first branch prediction corresponds to a second branch instruction within a second instruction cache line different from said first instruction cache line within an instruction cache; and
    a control unit coupled to receive said first branch prediction and said first alternate target indication from said branch prediction storage responsive to a first fetch address identifying said first instruction cache line or a second fetch address identifying said second instruction cache line, wherein said control unit is configured to select a third fetch address from one or more sources, and wherein said first branch target address is a first source of said one or more sources if said first fetch address is presented to said branch prediction storage and said first alternate target indication is in said first state, and wherein said first branch target address is said first source if said second fetch address is presented to said branch prediction storage and said first alternate target indication is in said second state.

15. The branch prediction unit as recited in claim 14 wherein said first storage location is further configured to store a second branch prediction and a second alternate target indication.

16. The branch prediction unit as recited in claim 14 wherein said first instruction cache line is stored at a first index within said instruction cache and said second instruction cache line is stored at a second index within said instruction cache, wherein said second index is numerically one less than said first index.

17. The branch prediction unit as recited in claim 16 wherein said instruction cache is set associative.

18. The branch prediction unit as recited in claim 17 wherein said first instruction cache line and said second instruction cache line are stored in a same way of said instruction cache.

19. The branch prediction unit as recited in claim 18 wherein said first alternate target indication comprises a bit, and wherein said first state is said bit being clear, and wherein said second state is said bit being set.

20. The branch prediction unit as recited in claim 14 wherein said instruction cache is set associative and wherein said first instruction cache line and said second instruction cache line are stored in consecutive ways of a same index.

21. The branch prediction unit as recited in claim 20 wherein said first alternate target indication comprises a bit indicative, when clear, of said first state and indicative, when set, of said second state.

22. The branch prediction unit as recited in claim 20 wherein said first alternate target indication comprises a first way corresponding to said first instruction cache line in said first state, and wherein said first alternate target indication comprises a second way corresponding to said second instruction cache line in said second state.

23. A method for generating a fetch address, comprising:
reading a first alternate target indication and a first branch prediction including a first branch target address from a branch prediction storage, said first branch prediction and said first alternate target indication being stored in a first storage location assigned to a first cache line being concurrently fetched from an instruction cache, wherein said first alternate target indication, in a first state, indicates that said first branch target address corresponds to a first branch instruction within said first cache line, and wherein said first alternate target indication is indicative, in a second state, that said first branch target address corresponds to a second branch instruction within a different cache line from said first cache line; reading a second alternate target indication and a second branch prediction including a second branch target address from said branch prediction storage, said second branch prediction and said second alternate target indication being stored in a second storage location assigned to a second cache line, wherein said second alternate target indication is indicative, in said first state, that said second branch target address corresponds to a third branch instruction within said second cache line, and wherein said second alternate target indication is indicative, in said second state, that said second branch target address corresponds to a fourth branch instruction within said first cache line; and selecting said fetch address from a sequential address, said first branch target address, and said second branch target address, wherein said first branch target address is eligible for selection if a first alternate target indication corresponding to said first branch prediction is in said first state, and wherein said second branch target address is eligible for selection if a second alternate target indication corresponding to said second branch prediction is in said second state, and wherein said sequential address is eligible for selection if no branch target addresses are eligible for selection.

24. The method as recited in claim 23 wherein said reading a second branch prediction comprises incrementing an address corresponding to said first cache line by one index.

25. The method as recited in claim 24 wherein said branch prediction storage is set associative.

26. The method as recited in claim 25 wherein said reading a second branch prediction further comprises selecting said second branch prediction from a same way as said first branch prediction.

27. The method as recited in claim 26 further comprising reading a third branch prediction from said branch prediction storage.

28. The method as recited in claim 27 wherein said second branch prediction and said third branch prediction are stored in consecutive ways of a same index of said branch prediction storage.

29. The method as recited in claim 28 wherein said first alternate target indication comprises a bit indicative, when clear, of said first state and indicative, when set, of said second state.

30. The method as recited in claim 23 wherein said branch prediction storage is set associative.

31. The method as recited in claim 30 wherein said first branch prediction and said second branch prediction are stored in different ways of a same index of said branch prediction storage.

32. The method as recited in claim 31 wherein said first state comprises a first way value indicative of a first way in which said first branch prediction is stored, and wherein said second state comprises a second way value indicative of a second way in which said second branch prediction is stored.

33. A superscalar microprocessor comprising:
an instruction cache configured to provide a cache line of instruction bytes in response to a fetch address; and
a branch prediction unit coupled to receive said fetch address concurrent with said instruction cache receiving said fetch address, wherein said branch prediction unit is configured to select a subsequent fetch address from one or more sources, and wherein a first branch target address from a first branch prediction corresponding to said cache line is a first source of said one or more sources if a first alternate target indication corresponding to said first branch prediction is in a first state indicating that said first branch prediction corresponds to a first branch instruction within said cache line, wherein a second state of said first alternate target indication indicates that said first branch prediction corresponds to a second branch instruction within a first different cache line, and wherein a second branch target address from a second branch prediction corresponding to a second different cache line is a second source of said one or more sources if a second alternate target indication corresponding to said second branch prediction is in said second state indicating that said second branch prediction corresponds to a third branch instruction within said cache line, wherein said first state of said second alternate target indicates that said second branch prediction corresponds to a fourth branch instruction within said second different cache line.

34. The superscalar microprocessor as recited in claim 33 wherein said branch prediction unit comprises a branch prediction storage.

35. The superscalar microprocessor as recited in claim 34 wherein said branch prediction storage is configured with a plurality of storage locations, wherein each of said plurality of storage locations corresponds to a cache line within said instruction cache.

36. The superscalar microprocessor as recited in claim 35 wherein said plurality of storage locations are arranged identically to said cache lines in said instruction cache.

37. The superscalar microprocessor as recited in claim 36 wherein said instruction cache and said branch prediction storage are set associative.

38. The superscalar microprocessor as recited in claim 33 wherein said first cache line is stored at a first index within said instruction cache.

39. The superscalar microprocessor as recited in claim 38 wherein said second cache line is stored at a second index within said instruction cache, and wherein said second index is numerically one greater than said first index.

40. The superscalar microprocessor as recited in claim 39 wherein said instruction cache is set associative.

41. The superscalar microprocessor as recited in claim 40 wherein said first cache line and said second cache line are stored in a same way of said instruction cache.

42. The superscalar microprocessor as recited in claim 41 wherein said first alternate target indication and said second alternate target indication each comprise a bit indicative, when clear, of said first state and, when set, of said second state.

43. The superscalar microprocessor as recited in claim 33 wherein said instruction cache is set associative.

44. The superscalar microprocessor as recited in claim 43 wherein said first cache line and said second cache line are stored at a same index of said instruction cache.

45. The superscalar microprocessor as recited in claim 44 wherein said first cache line is stored in a first way of said same index and wherein said second cache line is stored in a second way of said same index.

46. The superscalar microprocessor as recited in claim 45 wherein said first alternate target indication and said second alternate target indication each comprise a way value, and wherein said first state comprises said way value indicating said first way, and wherein said second state comprises said way value indicating said second way.

47. The superscalar microprocessor as recited in claim 45 wherein said first way and said second way comprise consecutive ways.

* * * * *